United States Patent [19]

Flohr et al.

[11] Patent Number: 4,937,338

[45] Date of Patent: Jun. 26, 1990

[54] PIGMENTS

[75] Inventors: Helmut Flohr, Mainz/Weisenau; Joachim Jesse, Weisenheim am Sand; Bernhard Albert, Maxdorf; Peter Neumann, Wiesloch, all of Fed. Rep. of Germany

[73] Assignee: BASF Aktiengesellschaft, Ludwigshafen, Fed. Rep. of Germany

[21] Appl. No.: 340,767

[22] Filed: Apr. 20, 1989

Related U.S. Application Data

[62] Division of Ser. No. 235,276, Aug. 23, 1988, Pat. No. 4,851,549, which is a division of Ser. No. 870,749, Jun. 4, 1986, Pat. No. 4,785,088.

[30] Foreign Application Priority Data

Jun. 5, 1985 [DE] Fed. Rep. of Germany ....... 3520109

[51] Int. Cl.$^5$ .......................... C07F 9/00; C07F 9/02; C07F 11/00
[52] U.S. Cl. .......................................... 544/64; 544/4; 544/225; 546/8; 548/107; 556/9; 556/13; 556/14; 556/27; 556/28; 556/33; 556/42; 556/45; 556/57
[58] Field of Search ................. 544/4, 64, 225; 546/8; 548/107; 556/9, 13, 14, 27, 28, 33, 42, 45, 47

[56] References Cited

U.S. PATENT DOCUMENTS 4,668,774 5/1987 Loeffler et al. .................... 556/57 X Primary Examiner—Richard L. Raymond
Attorney, Agent, or Firm—Oblon, Spivak, McClelland, Maier & Neustadt

[57] ABSTRACT

Pigment of the general formula:

$$f.Het \quad (I)$$

where F is the cation of a cationic dye which has an absorption maximum at >700 nm and may or may not contain anionic groups and Het is an anion of a heteropolyacid based on tungsten, molybdenum, vanadium or a mixture of these with phosphorus, silicon, cobalt, aluminum, manganese, chromium, nickel or a mixture of these or a copper (I)-hexacyanoferrate(II) anion, are superior to the known IR dyes in terms of thermal stability and photostability, and give optical recording media having superior properties, such as a high signal/noise ratio.

7 Claims, No Drawings

PIGMENTS

This is a division of application Ser. No. 07/235,276, filed on Aug. 23, 1988, now U.S. Pat. No. 4,851,549, which is a divisional of application 06/870,749 filed June 4, 1986, now U.S. Pat. No. 4,785,088.

Many known organic substances absorb in the long wavelength visible spectral range and in the near IR range.

For a number of applications, many of these substances have the disadvantage that their morphology cannot be maintained or modified in the required manner, or the substances themselves are modified in an undesirable maanner before, during and/or after processing, for example as a result of crystallization, fading due to light or heat, bleeding or chalking.

It is an object of the present invention to provide novel pigments which absorb at above 700 nm and do not have the disadvantages of the prior art IR-absorbing compounds.

We have found that this object is achieved by the pigments according to the invention.

The present invention accordingly relates to pigments of the general formula $F.Het$ (I)

where F is a cation of a cationic dye which has an absorption maximum >700 nm and may or may not contain anionic groups, and Het is an anion of a heteropolyacid based on tungsten and/or molybdenum with phosphorus, silicon, vanadium, cobalt, aluminum, manganese, chromium and/or nickel or a copper(I)-hexacyanoferrate(II) anion $[Cu_3Fe(CN)_6]^{\ominus}$, the pigments being obtainable by laking the cationic dyes with the heteropolyacids.

The novel pigments consist of uniform fine particles having a diameter of from about 10 to 1000 nm, depending on the preparation.

Many disadvantages of the soluble dyes can be overcome with the aid of the color lakes of the present invention.

The novel pigments (I) can easily be incorporated into polymers, and the latter can be pigmented in the form of a solution or in the melt. The pigments can also be incorporated into polymers by using dispersions of (I), and the pigments can be homogeneously distributed in a high concentration. The color lakes (I) can be applied onto surfaces by conventional methods and can also be processed by conventional printing methods, such as letterpress, gravure or offset printing. For example, bar codes which can be read using IR light sources can be produced by printing.

The dispersions of the pigments (I) can also be used as an absorber layer in optical storage media.

The pigments according to the present invention can furthermore be employed for IR absorption in plastics or as an absorber layer in solar collectors.

For certain applications, films containing (I) can also be used for signal control by photodiodes emitting in the long wavelength range, for example for switching off at the end of video and audio tapes.

Particularly suitable pigments (I) are those in which the dye cation F is of the general formulae (II) to (VII):

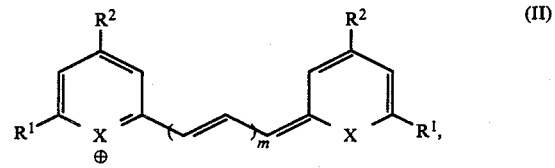

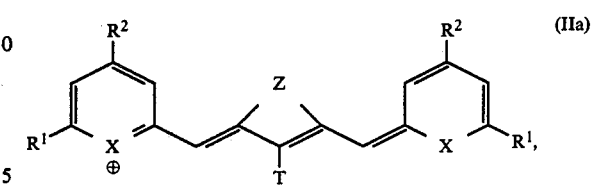

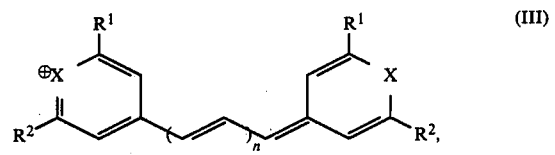

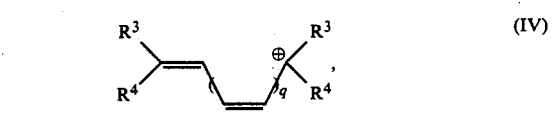

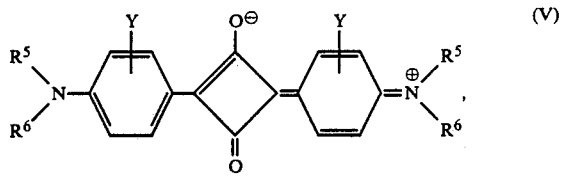

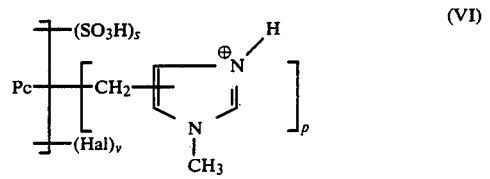

and

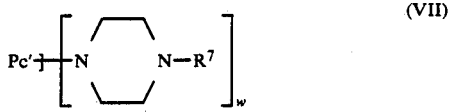

In the formulae, $R^1$ and $R^2$ independently of one another are each $C_1-C_4$-alkyl or are each heteroaryl or phenyl which is unssubstituted or substituted by hydroxyl, $C_1-C_4$-alkyl, $C_1-C_4$-alkoxy or halogen, X is oxygen or sulfur, Z is $-(CH_2-)_r$, where r is 2 or 3, T is phenyl or halogen, such as bromine or chlorine, preferably phenyl or chlorine, one of the radicals $R^3$ and $R^4$ is

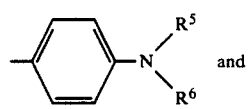

and the other radicals $R^3$ and $R^4$, independently of one another, are each phenyl which is unsubstituted or substituted by $C_1-C_4$-alkyl, $C_1-C_4$-alkoxy or halogen or, in the 4-position, by

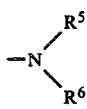

$R^5$ and $R^6$ independently of one another are each hydrogen, $C_1$–$C_6$-alkyl, $C_2$–$C_6$-hydroxyalkyl, $C_1$–$C_4$-alkoxy-$C_2$- or -$C_3$-alkyl, allyl, 2-($C_2$–$C_4$-alkanoyloxy)-ethyl or 2-cyanoethyl, or

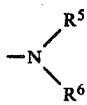

is a radical of a saturated 5-membered or 6-membered heterocyclic ring, Y is hydrogen, hydroxyl, $C_1$–$C_4$-alkyl or $C_1$–$C_4$-alkoxy, m, n and q are each 0, 1 or 2, Pc is a (p+s+v) valent radical of a metal-frame phthalocyanine or of a metal phthalocyanine which contains VO, TiO, Pb, Sn, Cu, Ni or Mn as the central metal atom and in which the methylene group is bonded to a carbon atom of the imidazole ring, p is 1 to 4, s is 0 or 1, v is 0, 1, 2, 3 or 4, Pc' is a w valent radical of a metal-free phthalocyanine or of a metal phthalocyanine which contains VO, TiO, Pb, Sn, Cu, Ni or Mn as the central metal, Hal is bromine, preferably chlorine or fluorine, $R^7$ is $C_1$–$C_4$-alkyl, $C_2$–$C_4$-hydroxyalkyl or $C_2$–$C_4$-aminoalkyl and w is 1, 2, 3 or 4.

Specific examples of radicals are as follows:

Halogen is fluorine, bromine and, in particular chlorine.

$R^1$ and $R^2$ are $C_1$–$C_4$-alkyl, such as methyl, ethyl, propyl and butyl, phenyl, 2-, 3- and 4-tolyl, 2-, 3- and 4-ethylphenyl, 3- and 4-n- and -isopropylphenyl, 3- and 4-n-, -iso- and -tert-butylphenyl, 2-, 3- and 4-chlorophenyl, 3- and 4-bromophenyl, 3- and 4-methoxyphenyl, and 3- and 4-ethoxyphenyl, of which the phenyl radicals substituted in the 4-position are preferred; aand hetaryl, such as 2- and 3-thienyl, 4-thiazolyl and 2- and 3-furanyl. T is phenyl, chlorine or bromine, preferably phenyl or chlorine, Z is $+CH_2+_2$ and $+CH_2+_3$.

The remaining substituted phenyl radicals $R^3$ and $R^4$ are the substituted phenyl radicals stated for $R^1$ and $R^2$, as well as phenyl which is unsubstituted and substituted in the 4-position by

$R^5$ and $R^6$ are each hydrogen, $C_1$–$C_6$-alkyl, such as methyl, ethyl, n- and isopropyl, n- and isobutyl, pentyl and n-hexyl, $C_2$–$C_4$-hydroxyalkyl, such as 2-hydroxyethyl and 2- and 3-hydroxypropyl, $C_1$–$C_4$-alkoxy-$C_2$- or -$C_3$-alkyl, such as 2-methoxyethyl, 2-ethoxyethyl, 2-n- and 2-isopropoxyethyl, 2-n-butoxyethyl, 3-methoxypropyl, 3-ethoxypropyl, 3-n- and isopropoxypropyl and 3-n-butoxypropyl, allyl, 2-($C_2$–$C_4$-alkanoyloxy)-ethyl, such as 2-acetoxyethyl, 2-propionoxyethyl and 2-butyryloxyethyl, and 2-cyanoethyl.

Furthermore, suitable radicals are radicals of saturated 5-membered or 6-membered heterocyclic rings, such as pyrrolidinyl, piperidyl, morpholinyl, thiomorpholinyl, piperazinyl and N'-$C_1$–$C_4$-alkylpiperazinyl, such as N'-methyl-, N'-ethyl- and N'-butylpiperazinyl.

Y is hydrogen, hydroxyl, $C_1$–$C_4$-alkyl, such as methyl, ethyl, n- and isopropyl, n-, iso- and tert-butyl, and $C_1$–$C_4$-alkoxy, such as methoxy, ethoxy, n- and isopropoxy and n-butoxy.

$R^7$ is $C_1$–$C_4$-alkyl, such as methyl, ethyl, propyl and n- and isobutyl, $C_2$–$C_4$-hydroxyalkyl and $C_2$–$C_4$-aminoalkyl, such as 2-hydroxyethyl, 2- and 3-hydroxypropyl, 2-, 3- and 4-hydroxybutyl, 2-aminoethyl, 2- and 3-aminopropyl and 4-aminobutyl.

Preferred pigments (I) are those which contain cations of the formulae (II), (IV), (VI) or (VII), where $R^1$ and $R^2$ are each phenyl, $C_1$–$C_4$-alkylphenyl, $C_1$–$C_4$-alkoxyphenyl, 4-hydroxyphenyl, 2-thienyl or methyl, m is 1 or 2, $R^3$ and $R^4$ are each

and one of the 4 radicals $R^3$ and $R^4$ may furthermore be phenyl, the radicals $R^{10}$ independently of one another are each $C_1$–$C_4$-alkyl, in particular methyl or ethyl, q is 1 or 2, Pc is a metal phthalocyanine radical containing VO, Pb, Mn or Sn as the central atom, p is 1, 2, 3 or 4, s is 0, Hal is fluorine, v is 0 or 4, Pc' is a w-valent metal phthalocyanine radical containing VO, Pb, Mn or Sn as the central atom, $R^7$ is $C_1$–$C_4$-alkyl, 2-hydroxyethyl or 2-aminoethyl and w is 4.

Particularly noteworthy pigments (I) are those in which F is one of the following cations:

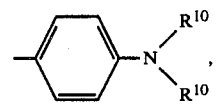

| Cation | $R^1$ | $R^2$ | m |
|---|---|---|---|
| X.1 | ⟨phenyl⟩ | ⟨phenyl⟩ | 1 |
| X.2 | ⟨phenyl⟩ | ⟨phenyl⟩ | 2 |
| X.3 | ⟨C₆H₄–OCH₃⟩ | ⟨C₆H₄–OCH₃⟩ | 1 |
| X.4 | " | " | 2 |

(X)

| Cation | R¹ | R² | m |
|---|---|---|---|
| X.5 | –C₆H₄–OH (para) | –C₆H₄–OH (para) | 1 |
| X.6 | " | " | 2 |
| X.7 | 2-thienyl | 2-thienyl | 1 |
| X.8 | " | " | 2 |
| X.9 | —CH₃ | —CH₃ | 1 |
| X.10 | —CH₃ | —CH₃ | 2 |

(XI)

| Cation | R¹ | R² | m |
|---|---|---|---|
| XI.1 | phenyl | phenyl | 2 |
| XI.2 | phenyl | phenyl | 2 |
| XI.3 | –C₆H₄–OCH₃ (para) | –C₆H₄–OCH₃ (para) | 1 |
| XI.4 | " | " | 2 |
| XI.5 | –C₆H₄–OH (para) | –C₆H₄–OH (para) | 1 |
| XI.6 | " | " | 2 |
| XI.7 | 2-thienyl | 2-thienyl | 1 |
| XI.8 | " | " | 2 |
| XI.9 | —CH₃ | —CH₃ | 1 |
| XI.10 | —CH₃ | —CH₃ | 2 |

(XII)

| Cation | R¹ = R² | Z | T |
|---|---|---|---|
| XII.1 | phenyl | —(CH₂)₂— | —Cl |
| XII.2 | phenyl | —(CH₂)₂— | phenyl |
| XII.3 | phenyl | —(CH₂)₃— | —Cl |
| XII.4 | phenyl | —(CH₂)₃— | phenyl |
| XII.5 | —CH₃ | —(CH₂)₂— | —Cl |
| XII.6 | —CH₃ | —(CH₂)₂— | phenyl |
| XII.7 | —CH₃ | —(CH₂)₃— | —Cl |
| XII.8 | —CH₃ | —(CH₂)₃— | phenyl |
| XII.9 | –C₆H₄–OCH₃ (para) | —(CH₂)₃— | —Cl |
| XII.10 | –C₆H₄–OCH₃ (para) | —(CH₂)₃— | phenyl |

(XIII)

| Cation | R¹ = R² | Z | T |
|---|---|---|---|
| XIII.1 | phenyl | —(CH₂)₂— | —Cl |

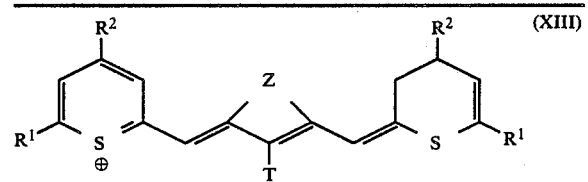

| Cation | R¹ = R² | Z | T |
|---|---|---|---|
| XIII.2 | 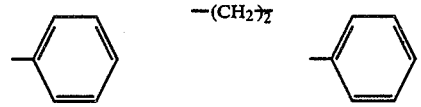 (phenyl) | —(CH₂)₂— | phenyl |
| XIII.3 | phenyl | —(CH₂)₃— | —Cl |
| XIII.4 | phenyl | —(CH₂)₃— | phenyl |
| XIII.5 | —CH₃ | —(CH₂)₂— | —Cl |
| XIII.6 | —CH₃ | —(CH₂)₂— | phenyl |
| XIII.7 | —CH₃ | —(CH₂)₃— | —Cl |
| XIII.8 | —CH₃ | —(CH₂)₃— | phenyl |
| XIII.9 | p-methoxyphenyl | —(CH₂)₃— | —Cl |
| XIII.10 | p-methoxyphenyl | —(CH₂)₃— | phenyl |

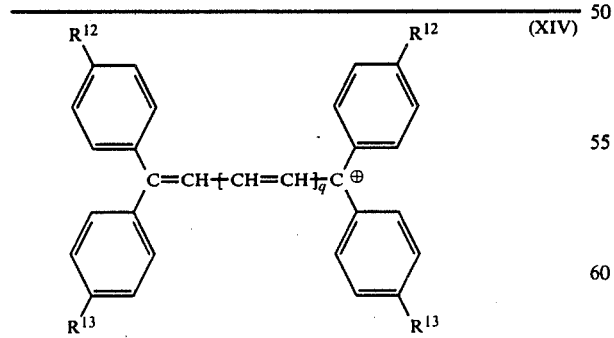

| Cation | R¹² | R¹³ | q |
|---|---|---|---|
| XIV.1 | —N(CH₃)₂ | —N(CH₃)₂ | 1 |
| XIV.2 | —N(CH₃)₂ | —H | 1 |
| XIV.3 | —N(C₂H₅)₂ | —N(C₂H₅)₂ | 1 |
| XIV.4 | —N(C₂H₅)₂ | —H | 1 |
| XIV.5 | —NH—C₂H₅ | —NH—C₂H₅ | 1 |

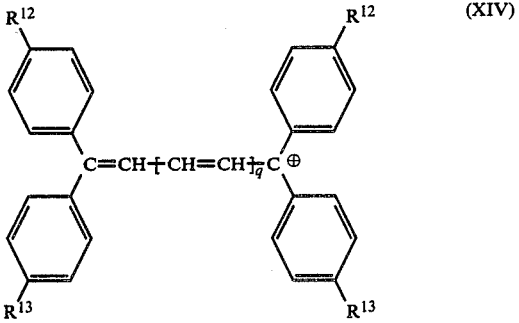

| Cation | R¹² | R¹³ | q |
|---|---|---|---|
| XIV.6 | —NH—C₂H₅ | —H | 1 |
| XIV.7 | —N(CH₃)₂ | —N(CH₃)₂ | 2 |
| XIV.8 | —N(C₂H₅)₂ | —N(C₂H₅)₂ | 2 |

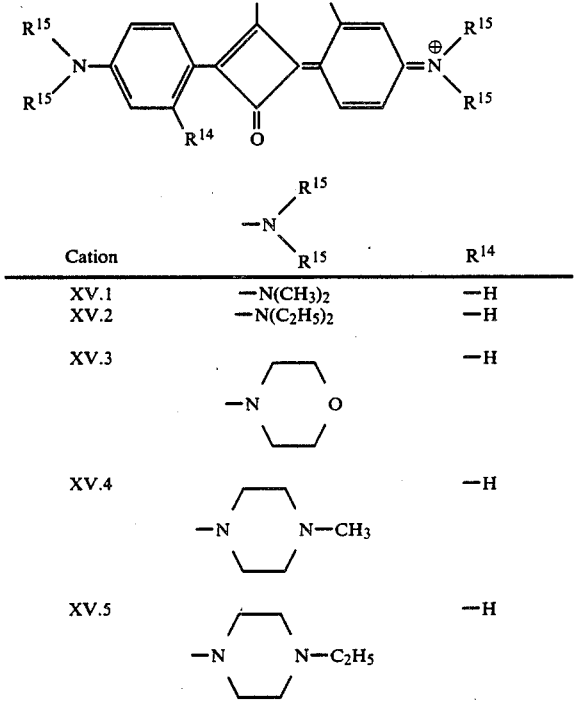

| Cation | —N(R¹⁵)(R¹⁵) | R¹⁴ |
|---|---|---|
| XV.1 | —N(CH₃)₂ | —H |
| XV.2 | —N(C₂H₅)₂ | —H |
| XV.3 | morpholino | —H |
| XV.4 | 4-methylpiperazino | —H |
| XV.5 | 4-ethylpiperazino | —H |
| XV.6 | —N(C₂H₅)₂ | —OH |
| XV.7 | —N(CH₃)₂ | —OH |
| XV.8 | morpholino | —OH |
| XV.9 | 4-methylpiperazino | —OH |
| XV.10 | 4-ethylpiperazino | —OH |

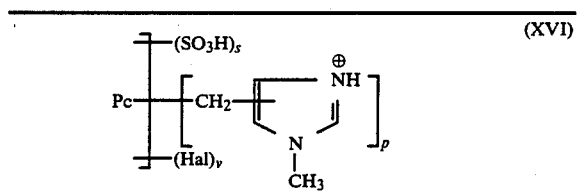

| Cation | Pc | p | s | Hal | v |
|---|---|---|---|---|---|
| XVI.1 | VOPhth | 1 | 0 | — | 0 |
| XVI.2 | VOPhth | 2 | 0 | — | 0 |
| XVI.3 | MnPhth | 1 | 0 | — | 0 |
| XVI.4 | MnPhth | 2 | 0 | — | 0 |
| XVI.5 | PbPhth | 2 | 0 | — | 0 |
| XVI.6 | PbPhth | 1 | 0 | — | 0 |
| XVI.7 | SnPhth | 1 | 0 | — | 0 |
| XVI.8 | SnPhth | 2 | 0 | — | 0 |
| XVI.9 | VOPhth | 1 | 0 | F | 4 |
| XVI.10 | VOPhth | 2 | 0 | F | 4 |

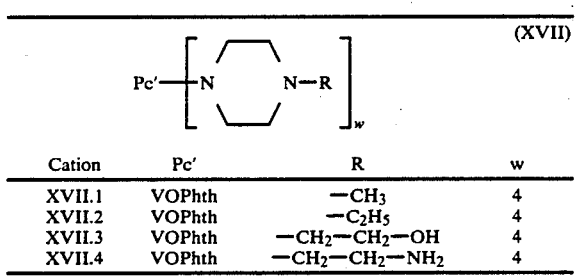

| Cation | Pc' | R | w |
|---|---|---|---|
| XVII.1 | VOPhth | —CH$_3$ | 4 |
| XVII.2 | VOPhth | —C$_2$H$_5$ | 4 |
| XVII.3 | VOPhth | —CH$_2$—CH$_2$—OH | 4 |
| XVII.4 | VOPhth | —CH$_2$—CH$_2$—NH$_2$ | 4 |

The cationic dyes containing F are known or can be prepared by a known method.

Suitable anions Het are derived from heteropolyacids based on tungsten, molybdenum or vanadium or mixtures of these with phosphorus, silicon, cobalt, aluminum, manganese, chromium or nickel or mixtures of these. The heteropolyacids of tungsten, of molybdenum, and of molybdenum and tungsten with phosphorus, silicon and/or vanadium are preferred. The copper-(I)-hexacyano-ferrate(II) anion is also suitable.

The preparation of the heteropolyacids and of the salts of these acids is known. The acids are obtained by acidifying solutions of tungstates, molybdates and/or vanadates in the form of the alkali metal and/or ammonium salts in the presence of phosphate and/or water-soluble silicates. By selecting the ratios of tungstate, molybdate, vanadate and phosphate and/or silica or of their salts, it is possible to synthesize various heteropolyacids. Examples of heteropolyacids are phosphomolybdic acid, silicomolybdic acid, phosphotungstic acid, silicotungstic acid, phosphovanadic acid, silicovanadic acid, phosphotungstomolybdic acid, silicotungstomolybdic acid, phospho- and silicotungstovanadic acid and phosphosilicotungstomolybdic acid, which may furthermore contain vanadium.

Phosphomolybdic acid, silicomolybdic acid, phosphotungstomolybdic acid and silicotungstomolybdic acid are preferred. The pigments (I) are prepared by a conventional method in which the cationic dyes containing F as a cation are laked with the heteropolyacids.

In order to obtain pigments which have a softer texture or more readily dispersible pigments, the aqueous filter cake can be converted to a dry powder by freeze-drying.

Another method comprises coating the precipitated pigments in aqueous suspension with an emulsion of oleic acid ethanolamide and C$_{13}$/C$_{15}$-paraffins in water or in the presence of aliphatic amines of not less than 10 carbon atoms, of long-chain alkylaminoalkanoic acids, of acidic or neutral phosphates, sulfuric acid half esters, long-chain alkanoic and alkenoic acids, alkylbenzenesulfonic acids, or adducts of ethylene oxide with alkylphenols, with long-chain alkanols or with alkylamines, polypropylene/polyethylene block copolymers or alkylphenols (German Laid-Open Application DOS 3,435,433).

Where (I) is processed to printing inks containing nitrocellulose as a binder, the stability can be increased by adding compounds which contain —N(—CH$_2$COOH)$_2$ groups, for example nitrilotriacetic acid or diethylenediaminetetraacetic acid (German Laid-Open Application DOS 2,707,972).

The Examples which follow illustrate the preparation of the novel pigments.

The pigments which are obtained by laking and are isolated can be used directly.

It is a further object of the present invention to provide a light-absorbing layer for optical recording media which meets the requirements set for such layers and is simple to prepare, stable over a long period, free from corrosion and non-toxic. Moreover, these recording media should be capable of being read and written on by means of a laser, such as an He-Ne laser or, preferably, a semiconductor laser.

We have found that this object is achieved and that superior optical recording media are obtained, if the latter contain one or more pigments of the formula (I) in the light-absorbing layer.

The pigments used according to the invention can be applied as a dispersion in a conventional manner, by immersion, knife-coating, spraying or whirler coating or by one of the conventional printing processes.

The recording media containing (I) have a high absorption at wavelengths >700 nm. These layers do not undergo troublesome changes, in contrast to layers which contain dyes in a molecular disperse (ie. dissolved) state. The novel layers do not crystallize and are stable to light, environmental effects such as light and humidity, and elevated temperatures. Because of their high absorption, the novel recording media are very sensitive to light from semiconductor lasers emitting at wavelengths of 750–900 nm.

The composition of the recording media is known per se and is part of the prior art (cf. for example U.S. Pat. Nos. 4,079,895, 4,242,689, 4,241,355, 4,023,185 and 4,380,769; German Laid-Open Applications DOS 3,007,296 and DOS 3,014,677; Japanese Preliminary Published Applications 1 12 793/1983, 1 32 231/1983, 1 12 790/1983, 1 25 246/1983 aand 56 892/1983; and EP-A 84 729).

Examples of suitable bases are disks/plates which may or may not be provided with a reflective coating and are made of glass or plastic, such as polymethyl methacrylate, polystyrene or polycarbonate, or of metal, such as aluminum.

A reflecting layer may be present underneath the light-absorbing layer, so that the incident light traveling through the colored layer (the light which is not absorbed) is reflected by the reflector layer and again travels through the colored layer.

Exposure can be effected through a transparent substrate. In this case, the sequence of layers is substrate-absorber layer-reflector; the reflector may be omitted.

According to the prior art (Bell, Spong; IEEE J. of Quantum Electronics Vol. QE-14 (1978), 7, page 490; RCA Reviews 40 (1979), page 345), it is advantageous if the thickness is equal to ¼ of the wavelength of the incident light, since interference results in a particularly high level of utilization (attenuation) of the incident light. However, we have found that very sensitive recording media are also obtained with layer thicknesses which are substantially smaller than ¼ of the wavelength of the incident light.

The light-reflecting layer should be such that it very quantitatively reflects the light used for recording and for scanning. Examples of suitable light-reflecting materials are aluminum, rhodium, gold, titanium, tin, lead, bismuth, copper and dielectric mirrors. The thickness of the light-reflecting layer should be such that it reflects as completely as possible the light used for recording or for scanning.

Reflecting materials having a low thermal conductivity are advantageous for this purpose.

Bases, or the light-reflecting layer, must have an optically smooth, level surface, and the surface must be such that the absorbing layer adheres firmly to it.

Preferred pigments (I) are those of the formula (II), (IV), (VI) or (VII). These pigments have a high absorption in the range from about 700 to 880 nm.

The pigments (I) are milled in a solvent which may or may not contain a binder, and are applied onto the base in the form of the resulting dispersion, by whirler-coating, knife-coating or immersion.

Any reflecting layers required are advantageously applied by vapor deposition under reduced pressure. Depending on the structure of the system, the reflecting laayer is applied onto the base or onto the absorbing layer. If appropriate, the reflecting layer may also be dispensed with. Suitable solvents or organic liquids for the dispersion are readily removable ones, such as methylene chloride, chloroform, acetone, methyl ethyl ketone, cyclohexane, toluene, acetonitrile, ethyl acetate, methanol or mixtures of these. Examples of binders, which may or may not be used, are polystyrene, polyvinyl acetate and polyvinylpyrrolidone.

For writing, a modulated laser beam is used. As a result of absorption of the incident light, the medium is heated at the appropriate point. Delamination processes, melting and/or vaporization processes produce a change in the reflectivity with respect to laser light at this point.

The conventional printing processes, such as letterpress, gravure, offset or screen printing, in particular offset printing and screen printing, are very useful for applying the pigments (I) onto the bases. These printing processes can be used to produce non-erasable audio and video media. To do this, a dispersion (ink) which contains one or more pigments (I) is used to print a pattern containing the stored information onto a base, for example an aluminum plate. The printed information can be read in a conventional manner by means of a laser, preferably a semiconductor laser, the laser beam being poorly reflected by the printed areas and strongly reflected by the unprinted areas.

These processes are simple and economical and permit precise reproducibility. They give recording materials which are highly stable and have a long life and are therefore particularly useful for the mass production of audio media (disks).

The Examples which following illustrate the invention. Parts and percentages are by weight.

Pigments

EXAMPLE 1

10 parts of the dye XIV.1, in the form of the iodide, were dissolved in 330 parts of 90% strength acetic acid under reflux, and the solution was then diluted with 400 parts of water. The dye was laked at 70° C. by adding a phosomolybdic acid solution prepared in a conventional manner from 10.4 g of molybdenum oxide and 1.0 part of disodium phosphate in 210 parts of water and having a pH of 2.2.

The pigment was stirred for a further 0.5 hour at 70° C. and then filtered off, washed and dried at 75° C.

EXAMPLE 2

The procedure described in Example 1 was followed, except that, before the laking process, the heteropolyacid obtained from 18.3 parts of molybdenum oxide and 1.76 parts of disodium phosphate in 230 parts of water was reduced with 4.4 parts of disodium sulfite and brought to pH 1.0 with hydrochloric acid.

EXAMPLE 3

The procedure described in Example 1 was followed except that, instead of the phosphonomolybdic acid, a heteropolyacid prepared in a conventional manner from 14.4 g of molybdenum oxide and 0.6 part of silica in 290 parts of water and having a pH of 1 was used.

EXAMPLE 4

The procedure described in Example 1 was followed, except that, instead of the phosphomolybdic acid, a heteropolyacid prepared in a conventional manner from 3.25 parts of molybdenum oxide, 5.8 parts of tungsten oxide and 0.7 parts of disodium phosphate and 140 parts of water and having a pH of 2.2 was used.

EXAMPLE 5

The procedure described in Example 1 was followed, except that, instead of the phosphomolybdic acid, a heteropolyacid prepared in a conventional manner from 7.25 parts of molybdenum oxide, 11.6 parts of tungsten oxide and 0.63 part of silica in 230 parts of water and having a pH of 3.0 was used.

EXAMPLE 6

11.4 parts of dye XVI.2 were dissolved in 200 parts of 50% strength acetic acid at 70° C., and was laked at this temperature with a heteropolyacid prepared in a conventional manner from 5.8 parts of molybdenum oxide and 0.56 part of disodium phosphate and 73 parts of water, reduced with 1.4 parts of $Na_2SO_3$ and brought to pH 1.0 with hydrochloric acid.

The pigment was filtered off, washed and dried at 75° C.

EXAMPLES 7 TO 33

The procedure described in Example 1, 2, 3, 4 or 5 was followed, except that 10 parts of the dye stated in the Table were used.

| Example | Dye cation | Counter ion from Example No. |
|---|---|---|
| 8 | X.1 | 1 |
| 9 | X.3 | 1 |
| 10 | X.7 | 1 |
| 11 | X.9 | 2 |
| 12 | XI.1 | 3 |

-continued

| Example | Dye cation | Counter ion from Example No. |
|---------|------------|------------------------------|
| 13 | XI.3 | 4 |
| 14 | XII.1 | 5 |
| 15 | XII.3 | 4 |
| 16 | XII.9 | 4 |
| 17 | XIII.3 | 5 |
| 18 | XIV.1 | 3 |
| 19 | XIV.3 | 1 |
| 20 | XIV.4 | 1 |
| 21 | XIV.7 | 2 |
| 22 | XIV.8 | 3 |
| 23 | XV.1 | 3 |
| 24 | XV.2 | 2 |
| 25 | XV.4 | 5 |
| 26 | XV.6 | 5 |
| 27 | XV.7 | 4 |
| 28 | XV.9 | 3 |
| 29 | XV.10 | 2 |
| 30 | XVI.2 | 2 |
| 31 | XVI.5 | 2 |
| 32 | XVII.1 | 1 |
| 33 | XVII.2 | 1 |

Recording media

EXAMPLE 1 OF USE

The dispersion described below was applied, by whirler coating, onto the reflector layer of a glass plate possessing a 50 nm thick aluminum reflector layer applied by vapor deposition. The layer was dried first in the air and then under reduced pressure.

The dispersion was prepared as follows: 0.1 g of the pigment, prepared as described in Example 1 using the dye XIV.1 in the form of the iodide, and 0.2 g of polyvinyl acetate were milled in 15 ml of methyl ethyl ketone to give a dispersion.

Compared with the coatings containing molecular disperse cationic dyes, such as XIV.1 (counter ions: $ClO_4^\ominus$, $BF_4^\ominus$ and $CF_3CO_2^\ominus$), layers containing the corresponding laked dyes possess substantially higher thermal stability and in particular light stability. Furthermore, the latter layers do not exhibit any change in morphology, such as crystallization of chalking.

The recording medium obtained was irradiated (written on) by means of light pulses from a semiconductor laser (820 nm), the intensity being 60 mW and the pulse length 100 nsec, and the radiation being focussed to a focal point of 1.0 μm diameter on the surface of the dye layer.

For playback, a non-modulated semiconductor laser beam which was focussed in the same manner and attenuated to 1 mW by means of filters was guided over the inscribed areas of the recording medium, and the light reflected by the medium was measured using a photodetector. Owing to the change in the layer, the reflectance in an area which has been written on beforehand differs substantially from that of an area which has not been written on, and this can be determined at this point by the photodetector.

Despite being substantially more stable to light and heat, the layer containing XIV.1 in laked form is no less sensitive than layers which contain the corresponding molecular disperse dye.

EXAMPLE 2 OF USE

An aluminum reflector layer 50 nm thick was applied by vapor deposition onto a PMMA plate in a vacuum apparatus. A suspension of 0.1 g of the pigment which contains (X.3) as the cation and contains a counter ion as described in Example 3, in a solution of 0.2 g of polyvinyl acetate in 20 g of methyl ethyl ketone, was applied onto the PMMA base provided with the reflective layer, and the dye layer was dried in the air and then under reduced pressure at room temperature.

Like the recording medium of Example 1 of use, the resulting recording medium could be written on using a semiconductor laser (820 nm).

EXAMPLES 3 TO 18 OF USE

The procedure described in Example 2 of use was followed, and a pigment dispersion was applied by whirler coating onto a PMMA plate provided with a reflective aluminum layer about 50 nm thick.

The following pigments were used:

| Example | Pigment (I) with cation | Counter ion from Example |
|---------|------------------------|--------------------------|
| 3 | XIV.1 | 4 |
| 4 | XIV.3 | 1 |
| 5 | XIV.7 | 2 |
| 6 | X.3 | 5 |
| 7 | X.7 | 1 |
| 8 | XII.1 | 2 |
| 9 | X.1 | 3 |
| 10 | XII.3 | 4 |
| 11 | XII.9 | 5 |
| 12 | XI.1 | 2 |
| 13 | XI.1 | 5 |
| 14 | XV.1 | 1 |
| 15 | XV.6 | 2 |
| 16 | XVI.2 | 4 |
| 17 | XVII.2 | 4 |
| 18 | XVII.1 | 5 |

We claim:
1. A pigment of the formula:

F·Het, where F is a dye cation of the formula:

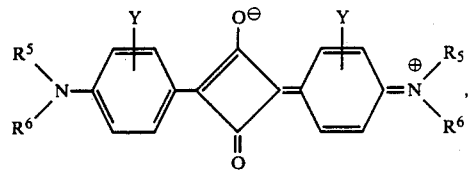

$R^5$ and $R^6$ independently of one another are each hydrogen, $C_1$–$C_6$-alkyl, $C_2$–$C_6$-hydroxyalkyl, $C_1$–$C_4$-alkoxy-$C_2$- or -$C_3$-alkyl, allyl, 2-($C_2$–$C_4$-alkanoyloxy)-ethyl or 2-cyanoethyl, or

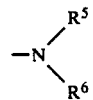

is a pyrrolidinyl, piperidyl, morpholinyl, thiomorpholinyl, piperazinyl or $N'$-$C_1$–$C_4$-alkylpiperazinyl, Y is hydrogen, hydroxyl, $C_1$–$C_4$-alkyl or $C_1$–$C_4$-alkoxy, said cation having an absorption maximum at >700 nm, and Het is an anion of a heteropolyacid based on tungsten, molybdenum, vanadium or a mixture of these with phosphorus, silicon, cobalt, aluminum, manganese, chromium, nickel or a mixture of these or is [$Cu_3$·Fe(CN)$_6$]$^-$, the pigment being obtained by laking the corresponding cationic dye with the heteropolyacid.

2. The pigment as claimed in claim 1, wherein Het is an anion of phosphomolybdic acid, of silicomolybdic acid, or phosphotungstomolybdic acid or of silicotungstomolybdic acid.

3. The pigment as claimed in claim 1, wherein $R^5$ and $R^6$ are methyl or ethyl or

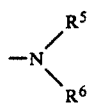

is morpholinyl or N'-methylpiperazinyl or N'-ethylpiperazinyl.

4. The pigment as claimed in claim 2, wherein $R^5$ and $R^6$ are methyl or ethyl or

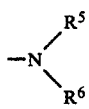

is morpholinyl or N'-methylpiperazinyl or N'-ethylpiperazinyl.

5. The pigment as claimed in claim 1, wherein Y is hydrogen or hydroxyl.

6. The pigment as claimed in claim 2, wherein Y is hydrogen or hydroxyl.

7. The pigment as claimed in claim 1, wherein

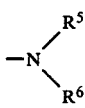

is dimethylamino, diethylamino, morpholinyl, N'-methylpiperazinyl or N'-ethylpiperazinyl and Y is hydrogen or hydroxyl.

* * * * *